United States Patent [19]

Taniguchi et al.

[11] Patent Number: 4,887,108
[45] Date of Patent: * Dec. 12, 1989

[54] PHOTOGRAPHIC CAMERA

[75] Inventors: Nobuyuki Taniguchi, Nishinomiya; Takeo Hoda, Kawachinagano; Yoshiaki Hata, Nishinomiya; Manabu Inoue, Kobe; Yoshinobu Kudo, Sakai; Hiroshi Ueda, Toyokawa, all of Japan

[73] Assignee: Minolta Camera Kabushiki Kaisha, Osaka, Japan

[*] Notice: The portion of the term of this patent subsequent to Aug. 30, 2005 has been disclaimed.

[21] Appl. No.: 199,201

[22] Filed: May 26, 1988

Related U.S. Application Data

[62] Division of Ser. No. 937,509, Dec. 3, 1986, Pat. No. 4,768,047.

[30] Foreign Application Priority Data

Dec. 4, 1985 [JP] Japan ................ 60-271630
Dec. 4, 1985 [JP] Japan ................ 60-271631
Dec. 16, 1985 [JP] Japan ................ 60-281051

[51] Int. Cl.$^4$ ............................... G03B 7/099
[52] U.S. Cl. ........................ 354/195.1; 354/446
[58] Field of Search ............... 354/446, 195.1, 195.11

[56] References Cited

U.S. PATENT DOCUMENTS 3,490,844  1/1970  Sapp ........................ 355/40
4,583,831  4/1986  Harvey ...................... 354/106
4,768,047  8/1988  Taniguchi et al. ........... 354/446 X

FOREIGN PATENT DOCUMENTS 54-26721  2/1979  Japan.
60-145428 9/1985  Japan.

OTHER PUBLICATIONS

Instruction Manual for the "Canon T80" photographic camera.

Primary Examiner—Michael L. Gellner
Attorney, Agent, or Firm—Burns, Doane, Swecker & Mathis

[57] ABSTRACT

A photographic camera having a real focal length photographing mode and two kinds of a first and a second pseudo focal length photographing modes. In the first pseudo focal length photographing mode, the photographic camera is capable of specifying a scope for printing narrower than the scope in the real focal length photographing mode. The photographic camera has a function for selecting either of the real focal length photographing mode and the first and second pseudo focal length photographing modes in order to output a mode signal in accordance with the selected mode, a function for measuring a brightness of an object to output a signal of the measured light in accordance with it, a function for outputting a signal in accordance with a film sensitivity and a function for calculating an exposure value in accordance with the signals of the mode, measured light and film sensitivity and also for rectifying the aperture to the open side in the second pseudo focal length photographing mode rather than in the first pseudo focal length photographing mode.

4 Claims, 7 Drawing Sheets

PHOTOGRAPHIC CAMERA

This application is a divisional of application Ser. No. 937,509, filed Dec. 3, 1986 now U.S. Pat. No. 4,768,047.

BACKGROUND OF THE INVENTION

The present invention generally relates to a photography and more particularly, to a photographic camera by which an object to be photographed can be taken in a pseudo focal length photographing mode as well as in a real focal length photographing mode.

In taking a photograph, it is especially important to determine a composition of an image to be represented on a print. Then, there has been known a method for changing the composition of an area of an object to be recorded on a frame of a film by altering the distance between a camera and the object, or by altering angle of view of a photographing lens with zooming operation of a zoom lens or with interchanging the objective lens mounted on the camera to that having different focal length. On the other hand, the other method has been known in which only a desired area of an image recorded on a frame is printed with enlargement. This method is called "trimming" in the field of photography. Thus, a print having a desired composition can be reproduced by using either of the above two methods.

One of the methods related to the latter for printing the negative through the trimming process is disclosed in the Japanese Patent Laid-open Application (Tokkai-sho) No. 54-26721 in which the photographic camera is provided with an optical finder system capable of selectively changing the field of view. By the aforementioned optical finder system, not only a scope of the object to be photographed is selected in the photographic camera, but also an information for trimming is recorded on a film loaded in the camera in accordance with the selection determined by using the optical finder system. Then, in case of the printing, a selected portion of the image is printed in accordance with the trimming information with an enlargement magnification different from that in the usual case, thus resulting in that it is capable of obtaining the print which looks like a print obtained from the frame which has been taken through a telephoto lens having a focal length longer than that of the objective lens actually mounted on the camera.

On the other hand, when a comparison is made between the photograph taken in the pseudo focal length photographing mode and another photograph taken, with respect to the same object as that of the former, through the lens having the same real focal length as is purposely set by the pseudo focal length photographing mode, it is readily appreciated that the photograph of the former has a depth-of-field deeper than that of the latter.

Hereupon, the depth-of-field a1 of the lens having the focal length of f1 is obtained as follows.

$$a1 \approx \frac{2 U^2 \delta F}{f1^2}, \quad (1)$$

where the distance up to the object is U on the assumption that U>f, an F-number of the lens is F and the diameter of a permissible circle of confusion is δ.

Likewise, the depth-of-field a2 of the lens having the focal length of f2 can be obtained by the following equation.

$$a2 \approx \frac{2 U^2 \delta F}{f2^2} \quad (2)$$

Meanwhile, suppose that an image of a frame photographed with using the lens having the focal length of f1 is printed with enlarging so as to be equivalent to a print enlarged and photographed with using the lens having the focal length of f2, the diameter of the permissible circle of confusion on the print should be limited to δ with respect to the frame photographed with using the lens having the focal length of f1. Therefore, the diameter of the permissible circle of confusion on the image to be recorded on the film should be $\delta \times f1/f2$.

The depth-of-field a3 in this case is expressed as follows.

$$a3 \approx \frac{2 U^2 \delta F}{f1 \cdot f2} \quad (3)$$

Accordingly, when the comparison is made between the depth-of-field a3 in the case where the photograph taken through the lens having the focal length of f1 is enlarged as described above and the depth-of-field a2 of the photograph taken through the lens having the focal length of f2, the following equation can be obtained.

$$a3 \approx a2 \frac{f2}{f1}$$

As a result, the photograph obtained through the trimming process has f2/f1 times deeper in the depth-of-field than that of the photograph taken through the lens having the focal length of f2, and since this proportion of depth-of-field corresponds to a ratio of enlargement in printing between the two prints.

As described above, since the photograph obtained through the trimming process has the deeper depth-of-field, both of a character and a background behind it are clearly photographed as, for example, in a snapshot taken during travelling. Although the photograph of this kind is preferable as a documentary photograph, when it is requested to obtain the photograph in which the character is caused to be in focus with the background behind it being blurred, the desired photograph can be hardly taken in the pseudo focal length photographing mode.

Moreover, since a frame adapted to be used in the pseudo focal length photographing mode by the above described camera is inevitably printed in an elongated form by an enlargement magnification larger than that in the real focal length photographing mode, there has been such a drawback that particles on the film tend to become conspicuous.

SUMMARY OF THE INVENTION

Accordingly, the present invention has been developed with a view to substantially eliminating the above described disadvantages inherent in the prior art photographic camera, and has for its essential object to provide an improved photographic camera having therein at least one pseudo focal length photographing mode in addition to a real focal length photographing mode, which camera hardly allow particles on the film to become conspicuous even in the photographing in the pseudo focal length photographing mode.

Another important object of the present invention is to provide a photographic camera of the above described type which is also suitably used for taking the photograph of a portrait.

A further object of the present invention is to provide a photographic camera of the above described type by which it is capable of obtaining, in the pseudo focal length photographing mode, the photograph having therein the shallow depth-of-field as in the real focal length photographing mode.

In accomplishing these and other objects, according to one preferred embodiment of the present invention, there is provided a photographic camera having therein two kinds of pseudo focal length photographing modes in addition to a real focal length photographing mode, by which camera it is capable, in a first pseudo focal length photographing mode, of obtaining a photograph having relatively deep depth-of-field as similar to the depth-of-field of another photograph obtained through a trimming process, and is capable, in a second pseudo focal length photographing mode, of obtaining a photograph having relatively shallower depth-of-field by further opening an aperture of the camera in the second mode as compared with that in the first mode.

A brief explanation will be described hereinafter with respect to the aperture and the depth-of-field for easy comprehension of characteristic features of the present invention.

When it is requested to cause the depth-of-field in the photograph taken through a lens having the focal length of f1 and F-number of F1 to be the same as that in the photograph taken through another lens having the focal length of f2 and F-number of F2 through trimming process of the former so as to be equivalent to the latter in a print size the following equation, can be obtained by the equations (2) and (3).

$$\frac{F2}{f2} = \frac{F1}{f1}$$

Accordingly, since $$\frac{f2}{f1} = \frac{F2}{F1},$$

when f2/f1 is equal to, for example, 2, it can be achieved by setting the aperture of a diaphragm to the larger side by a half time of F-number F1.

The photographic camera of the present invention is, therefore, provided with the first and second pseudo focal length photographing modes in addition to the real focal length photographing mode and is capable of specifying, in the first pseudo focal length photographing mode, a scope for printing narrower than the scope in the real focal length photographing mode. The photographic camera includes a mode selecting means for selecting either of the real focal length photographing mode and the first and second pseudo focal length photographing modes in order to output a mode signal in accordance with the selected mode, a light measuring means for measuring a brightness of an object to output a signal of the measured light in accordance therewith, means for outputting a signal in accordance with a film sensitivity, an exposure calculating and controlling means for calculating an exposure value in accordance with the signals of the mode, measured light and film sensitivity and capable of rectifying the aperture to the larger side in the second pseudo focal length photographing mode rather than in the first pseudo focal length photographing mode.

By the above described construction of the photographic camera of the present invention, when a signal caused by the selection of the first pseudo focal length photographing mode has been inputted into the exposure calculating and controlling means, the exposure value is calculated from the brightness of the object and the sensitivity of the film used to control the exposure of the camera without any rectification for the calculated exposure value. On the other hand, when a signal caused by the selection of the second pseudo focal length photographing mode has been inputted into the exposure calculating and controlling means, the ordinary exposure value calculated firstly is rectified by a predetermined exposure amount so as to set the aperture to the larger side and the exposure is controlled by this rectified exposure value. As a result, in the case where the second pseudo focal length photographing mode has been selected, the photograph having shallow depth-of-field can be obtained due to the fact that the aperture is set to the larger side rather than in the ordinary case.

BRIEF DESCRIPTION OF THE DRAWINGS

These and other objects and features of the present invention will become apparent from the following description taken in conjunction with the preferred embodiment thereof with reference to the accompanying drawings, throughout which like parts are designated by like reference numerals, and in which.

DETAILED DESCRIPTION OF THE INVENTION

Figure 1:
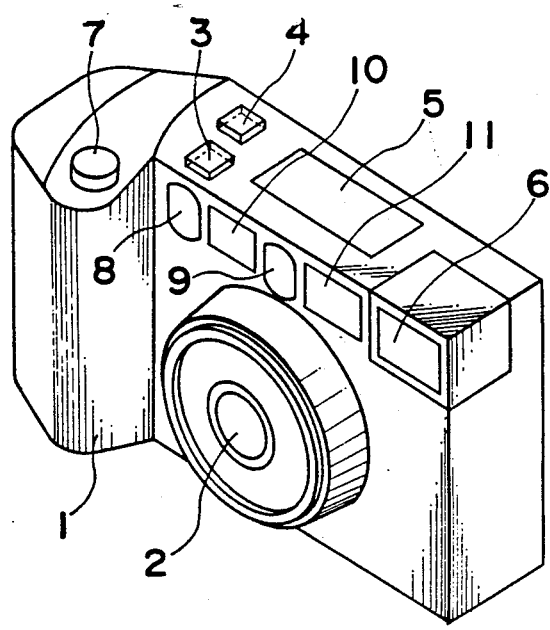
FIG. 1 is a perspective view of a photographic camera according to one preferred embodiment of the present invention.

Referring now to the drawings, there is shown in FIG. 1, a photographic camera 1 according to one preferred embodiment of the present invention, which is provided with a camera body 1, an objective lens 2 at the front portion thereof, a first mode selector 3 at the upper portion thereof for alternately selecting either of a real focal length photographing mode and a pseudo focal length photographing mode, whenever it is depressed, and a second mode selector 4 disposed in the vicinity of the first mode selector 3 for selecting either of a first pseudo focal length photographing mode and a second pseudo focal length photographing mode when the pseudo focal length photographing mode is selected by the first mode selector 3, with a depth-of-field is shallower in a photograph taken in the first pseudo focal length photographing mode than in another photograph taken in the second mode. There are also disposed at the upper portion of the camera body 1, a liquid crystal display panel 5 in which a plurality of the photographing modes are schematically illustrated, an electronic flash 6, a shutter release button 7, a set of range finder windows 8 and 9 in an automatic focus detecting portion thereof, a frame illumination window 10 and a view finder 11.

Figure 2A:
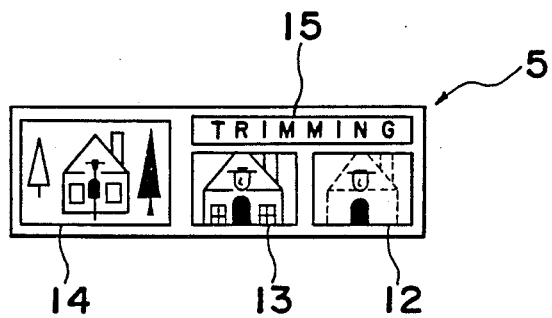
FIG. 2a is a schematic view of a liquid crystal display panel showing thereon each of photographing modes.

FIG. 2a shows the liquid crystal display panel 5 schematically illustrating thereon a plurality of display portions 14 and 15 respectively for the real focal length photographing mode and for the pseudo focal length photographing mode, with the latter 15 further including two portions 12 and 13 respectively for the first mode and for the second mode.

Figure 2B:
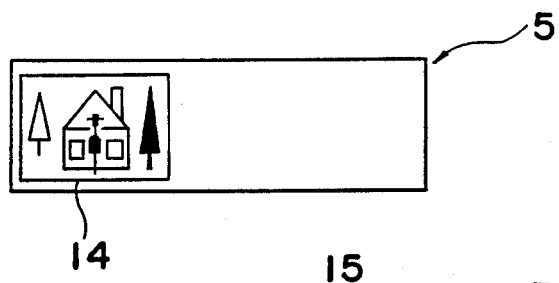
FIG. 2b l is a schematic view of the liquid crystal display panel showing thereon a real focal length photographing mode.

FIG. 2b illustrates a displaying state of the liquid crystal display panel 5 in the case where the real focal length photographing mode has been selected, in which mode only the display portion 14 therefor is turned on.

Figure 2C:
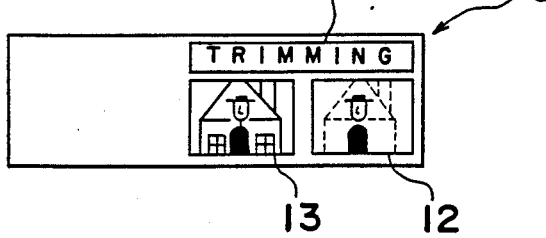
FIG. 2c is a schematic view of the liquid crystal display panel showing thereon a pseudo focal length photographing mode.

FIG. 2c illustrates another displaying state of the liquid crystal display panel 5 in the case where the pseudo focal length photographing mode has been selected, in which mode all of the display portions 12, 13 and 15 for the pseudo focal length photographing mode are turned on. In this pseudo focal length photographing mode, when the first mode has been selected, the display portion therefor 12 is lit up deeply and the display portion 13 for the second mode is lit up slightly. On the contrary, when the second mode has been selected, the display portion therefor 13 is lit up deeply and the display portion 12 for the second mode is lit up slightly.

In the next place, a camera system for the photographic camera of the present invention will be explained hereinafter.

Figure 3:
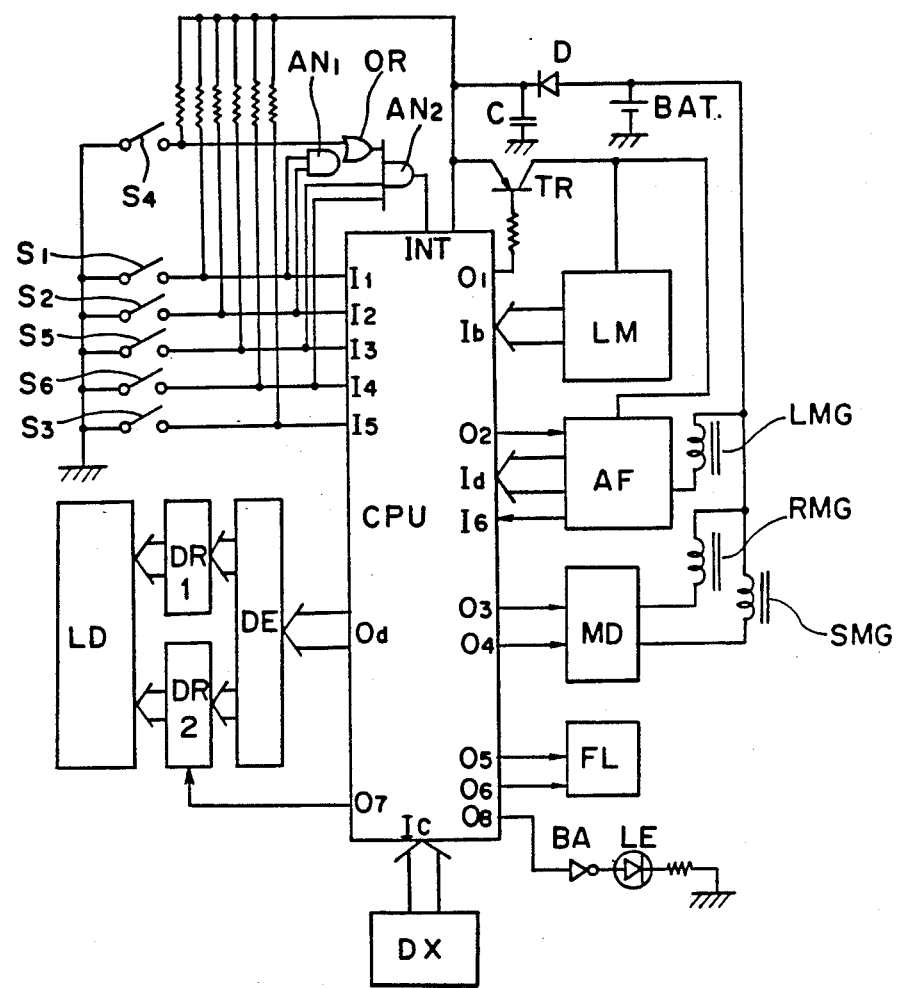
FIG. 3 is a circuit diagram of a camera system of the present invention.

FIG. 3 shows one example of a circuit diagram for the camera system. In FIG. 3, a micro-processor is employed as a CPU (Central Processing Unit) which commences its operation by receiving an interruption signal at an interruption terminal INT thereof, though it is normally kept in a stand-by condition in which a clock is brought to a halt to extremely lower the amount of an electric consumption.

There are provided a light measuring switch S1 for measuring incident-light, a release switch S2, a trigger switch S3, a wind up completion switch S4, a first mode selector switch S5 and a second mode selector switch S6, all of which switches S1, S2, S3, S4, S5 and S6 are collectively grounded at their movable contacts, while the switches. S1, S2, S3, S5 and S6 are respectively connected to input ports I1, I2, I5, I3 and I4 of the CPU at their stationary contacts and the switch S4 is connected at its stationary contact to the interruption terminal INT of the CPU through an OR-gate OR and an AND-gate AN2. Furthermore, not only all of the stationary contacts of the switches S1, S2, S3, S4, S5 and S6 are connected to a power battery BAT through respective resistors, but also the stationary contacts of the switches S1, S2 and the switches S5, S6 are connected to the interruption terminal INT of the CPU respectively through an AND-gate AN1, the OR-gate OR and the AND-gate AN2, and the AND-gate AN2.

Upon depression of the shutter release button 7, the light measuring switch S1 and the release switch S2 are turned on respectively at the first step of the depression of the shutter release button 7 and at the second step thereof. The trigger switch S3 is turned on and off respectively when the shutter begins to open and when a film is completely wound up. The wind up completion switch S4 is turned off at the completion of an exposure control operation and is turned on at the completion of winding-up of the film. The first mode selector switch S5 is operated through the depression of the first mode selector 3 for selecting either of the real focal length photographing mode and the pseudo focal length photographing mode, and the second mode selector switch S6 is operated through the depression of the second mode selector 4 for alternately changing over the first and second modes of the pseudo focal length photographing mode. Signals from the switches S1, S2 and S5, S6 are inputted into the interruption terminal INT respectively through the AND-gates AN1 and AN2. On the other hand, a signal from the switch S4 is inputted into the OR-gate OR and when the switch S4 is off during the release operation, none of the input signals from the switches S1 and S2 are inputted into the interruption terminal INT.

There are also provided a light measuring portion LM connected to an input port Ib of the CPU for measuring a brightness of an object to give an information thereof into the input port Ib after A/D conversion of the information, and an automatic focus adjusting portion AF connected to an output port 02 and input ports Id and I6 of the CPU for measuring a distance up to the object in order to control the focusing of the lens. Both of the light measuring portion LM and the automatic focus adjusting portion AF are further connected to a collector of a power transistor TR so as to be supplied with an electric power therefrom. The power transistor TR is connected at its emitter to the power battery BAT and at its base to an output port 01 of the CPU through a resistor so as to be controlled by a signal therefrom. A control portion MD for controlling a release magnet RMG and a shutter magnet SMG is so provided as to be connected thereto and to output ports 03 and 04 of the CPU in order to operate these magnets RMG and SMG by signals therefrom. Moreover, the automatic focus adjusting portion AF is connected to a lens magnet LMG for controlling the focusing of the lens and all of the magnets RMG, SMG and LMG are collectively connected to a power battery BAT so as to be supplied with the electric power therefrom.

The operations of the light measuring portion LM and the automatic focus adjusting portion AF are commenced by the supply of the electric power and thereafter, although the signals therefrom are applied to the input ports Ib and Id respectively, the automatic focus adjusting portion AF further receives a release signal from the output port 02 of the CPU so as to monitor the shifting amount of the lens. When this amount coincides with the distance measured, the shifting of the lens is interrupted by de-energizing the lens magnet LMG. Thereafter, the input port I6 of the CPU is applied with a signal informing the interruption of shifting of the lens after completion of its focus adjustment. It is mechanically so constructed that when the release magnet RMG is kept on during a predetermined period, it starts the release operation, and the shutter starts to open when the shutter magnet SMG is turned on and starts to close when the shutter magnet SMG is turned off.

A flash portion FL, including a control portion of the electronic flash 6 and a light emitting portion thereof, is controlled in accordance with signals produced from output ports 05 and 06 of the CPU. When the signal is produced from the output port 05 of the CPU, electrical charge of a main capacitor which stores electric energy used for emitting light is initiated. And, when the signal is produced from the output port 06 of the CPU, the light emitting operation is initiated in the flash portion FL.

A light emitting element LE is connected to an output port 08 of the CPU through a driving buffer BA and is grounded through a resistor so as to print pseudo focal length photographing information in the film in case of photographing in the pseudo focal length photographing mode.

A film sensitivity information recorded on a film cartridge is read by a film sensitivity reading portion DX and is directly inputted into the CPU through an input port Ic.

Constituents for indicating the photographing mode on the liquid crystal display panel are composed of a decode portion DE of display signals directly outputted from an output port Od of the CPU, a liquid crystal display element LD and a couple of drivers DR1 and DR2 for driving the display element LD. A signal outputted from an output port 07 of the CPU is the signal for controlling the density of the display element by changing a driving voltage for the display element LD in accordance with the kind of the photographing modes in case of the pseudo focal length photographing mode and this signal is directly inputted into the driver DR2.

The electric power is supplied to this camera system from the power battery BAT and is substantially stabilized by a condenser C and a diode D.

Subsequently, with reference to FIGS. 4a, 4b, 5 and 6, a signals treatment related to the photographing and conducted in the CPU will be explained hereinafter.

Figure 4A:
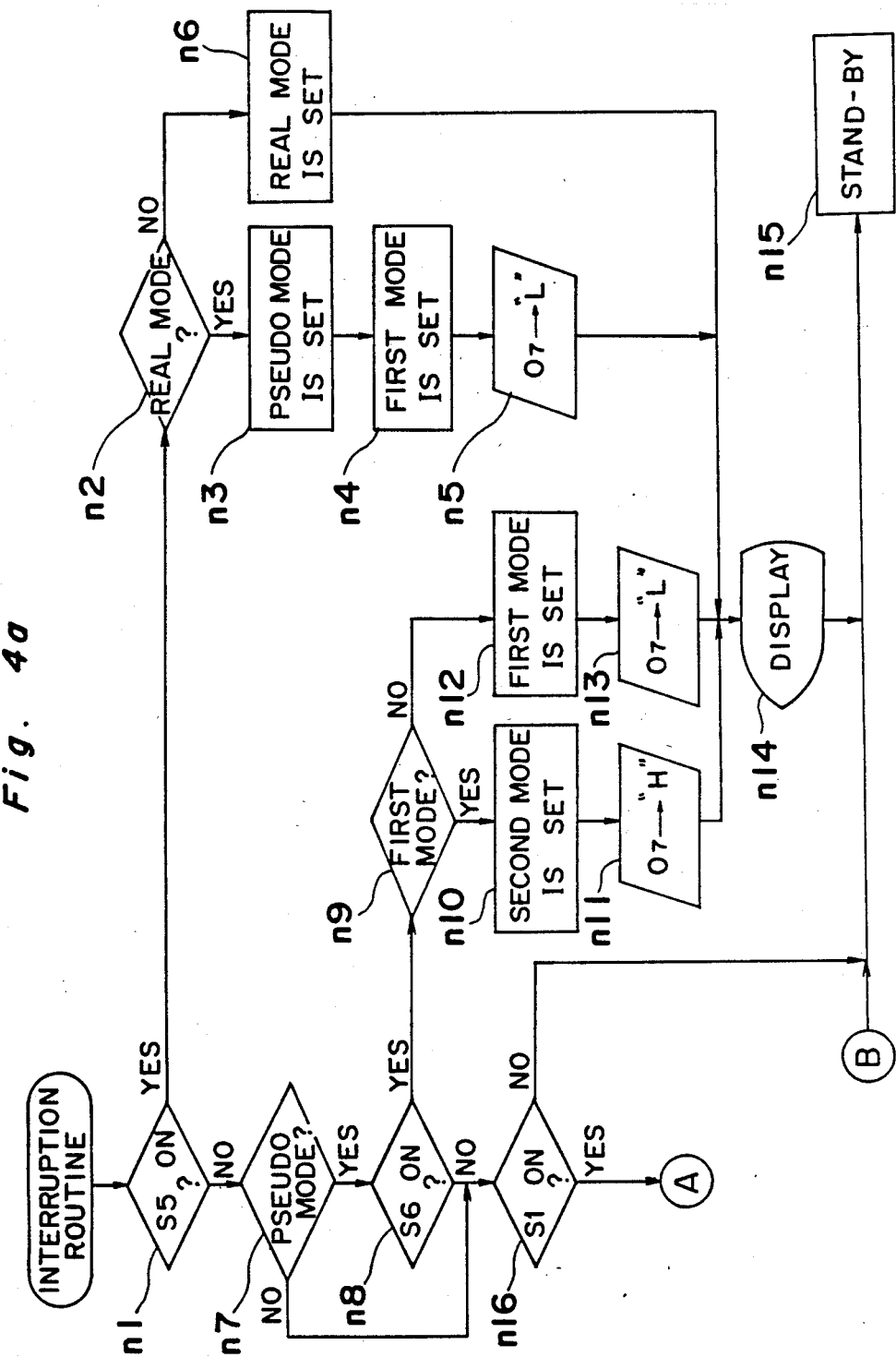
FIGS. 4a and 4b which are continuous onto each other, are a flow-chart of signals management in a CPU, which particularly shows a routine for an interruption process.
Figure 4B:
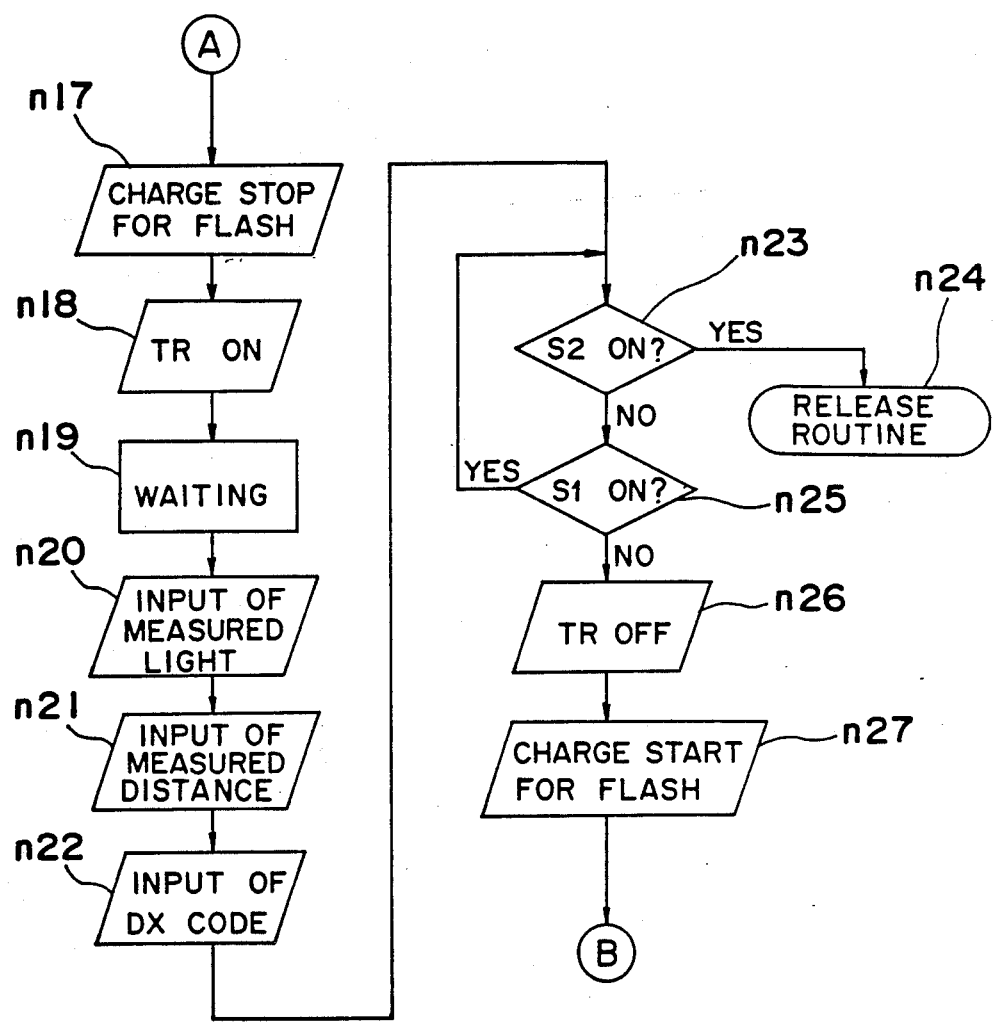

Referring first to a flow-chart of FIGS. 4a and 4b, specific functioning for an interruption will be described.

When an interruption signal is inputted into the interruption terminal INT, it is judged whether the interruption is caused from either one of the switches S1, S2. S5 and S6. In this case, the first mode selector switch S5 is firstly checked up at step n1 and when the switch S5 is on, it is examined at step n2 whether the photographing mode set previously is the real focal length photographing mode or the pseudo focal length photographing mode. If the previous mode is the real focal length photographing mode, the pseudo focal length photographing mode is newly set in place of the real focal length photographing mode at step n3, and on the contrary, if the previous mode is the pseudo focal length photographing mode, the real focal length photographing mode is newly set at step n6. Through this management, both of the photographing modes can be alternately changed over whenever the first mode selector switch S5 is turned on.

When the pseudo focal length photographing mode has been set, the first mode thereof having a shallow depth-of-field is selected at step n4 and accordingly, the signal from the output port 07 for controlling the density of the display element in the photographing mode display portions is caused to be "L" at step n5 and thereby, the photographing mode display portions turn into the displaying state as shown in FIG. 2c, in which the display portion 12 for the first mode is deeply displayed and another display portion 13 for the second mode is lightly displayed. Furthermore, when the real focal length photographing mode has been set, the photographing mode display portions turn into the displaying state as shown in FIG. 2b.

Referring back to step n1, when the first mode selector switch S5 is off, the previous photographing mode is examined at step n7 and thereafter, if the pseudo focal length photographing mode is set, the second mode selector switch S6 is checked up at step n8. When the switch S6 is on, it is examined at step n9 whether the photographing mode set previously is either one of the first and second modes. If the first mode is set, the second mode is newly set in place of the first mode at step n10 and on the contrary, if the second mode is set, the first mode is newly set at step n12. Thereafter, the signal outputted from the output port 07 is caused to be "H" at step n11 in case of the second mode or is caused to be "L" at step n13 in case of the first mode and in addition, the camera system displays each of the display portions in accordance with this result at step n14.

In either of the above described cases, after the display of the photographing mode, the system is brought into a stand-by state at step n15.

When the previous photographing mode is the real focal length photographing mode at step n7, or when the second mode selector switch S6 is off at step n8, the light measuring switch S1 is checked up at step n16 and when the switch S1 is off, it means an occurrence of the interruption caused, for example, by any possible noise or by the fact that the second mode selector switch S6 has been turned on in the real focal length photographing mode, and in this case, the system is brought into the stand-by state without any management at step n15.

When the light measuring switch S1 is in the on-state at step n16, a voltage raising operation for the purpose of charging the main capacitor in the flash portion FL is brought to a halt at step n17 in order to prevent any possible influence to the light measurement and the focus adjustment caused by a fluctuation of the power voltage. Thereafter, the power transistor TR is turned on at step n18 to supply the electric power to the light measuring portion LM and the automatic focus adjusting portion AF, and the operation for measuring the incident-light and the distance up to the object is commenced. At step n19, the system is kept waiting for a predetermined period until the light measurement and the distance measurement are completed and both values of a measured light and a measured distance are inputted into the CPU at steps n20 and n21, respectively.

Then, the information of the film sensitivity recorded on the film cartridge is read through the operation of the reading portion DX and is inputted into the CPU at step n22 preparatory to the shutter release. Upon examination of the release switch S2 at step n23, when the switch S2 is on, the procedure proceeds to a release routine at step n24. When the switch S2 is off at step n23, the light measuring switch S1 is examined at step n25, and if the switch S1 is in the on-state, the procedure returns back to step n23. If the switch S1 is off, the power transistor TR is turned off at step n26 and as a result, both of the light measuring portion LM and the distance measuring portion AF are caused to be out of operation. Thereafter, upon commencement of raising voltage for charging the flash light emitting element at step n27, the system returns to the stand-by state at step n15.

Figure 5:
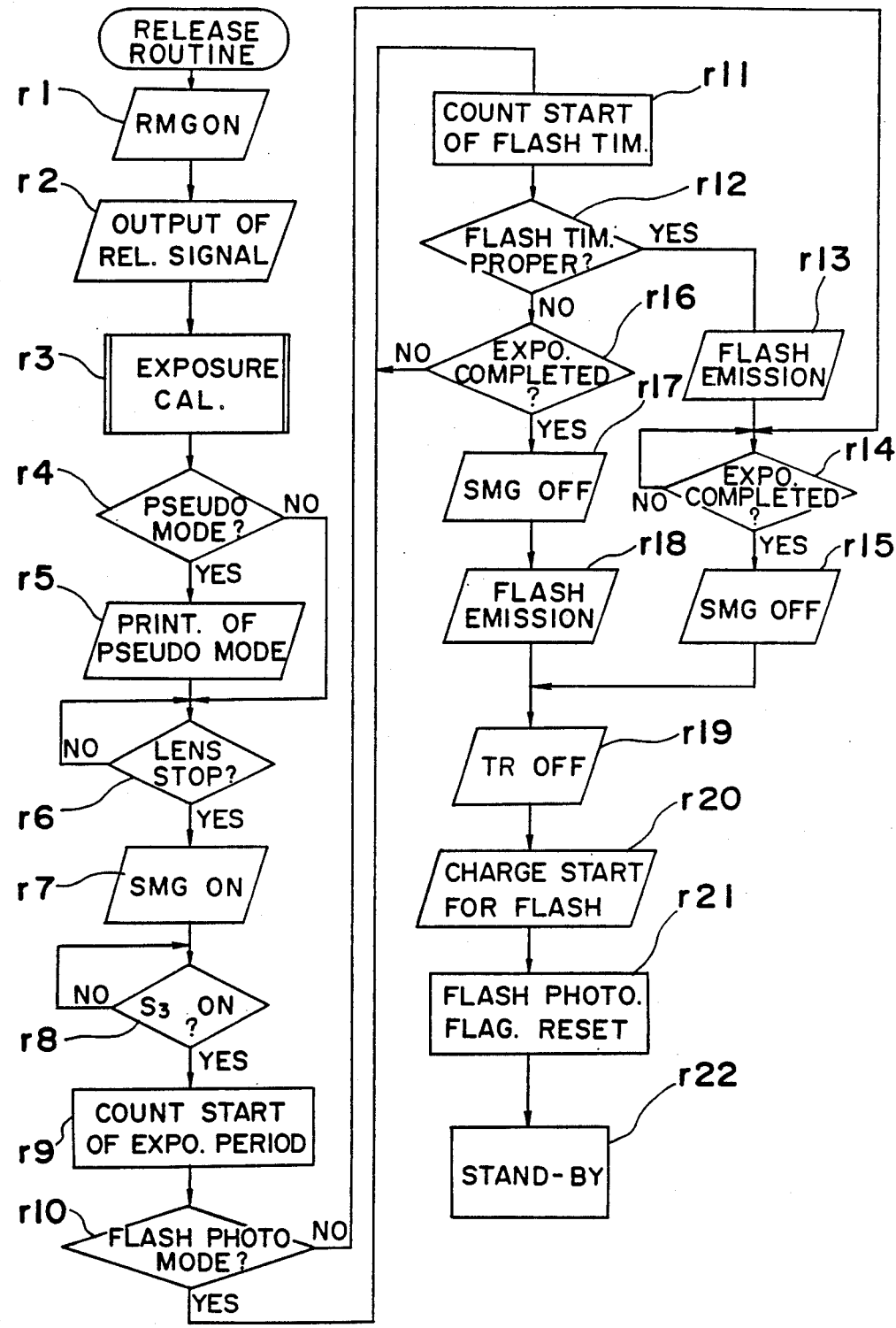
FIG. 5 is a flow-chart of signals management in the CPU, which particularly shows a routine for a release process.

Referring next to a flow-chart of FIG. 5, the release routine will be explained hereinafter.

Firstly, at step r1, the release magnet RMG is kept on for a predetermined period by the signal from the output port 03 of the CPU, and the automatic focus adjusting portion AF is applied with a release signal at step r2 by an output signal from the port 02 of the CPU. Upon commencement of the lens release operation through the aforementioned process, the lens is caused to move until the in-focus condition is obtained, and this result is inputted into the input port I6 of the CPU.

On the other hand, the CPU substantially executes an exposure calculation at step r3 for determining the exposure value from the informations such as the measured light value and the film sensitivity in order to calculate an opening period of the shutter (an exposure time) and a timing of the flash emission. The foregoing exposure calculation by the CPU will be later explained in detail.

After completion of the exposure calculation, the photographing mode is checked up at step r4 and when the pseudo focal length photographing mode is set, the signal for printing the pseudo focal length photographing mark on the film is outputted from the output port 08 of the CPU at step r5 so as to light up the light emitting element LE. The lighting period of the light emitting element LE is controlled by the information of the film sensitivity inputted into the CPU in advance. When the real focal length photographing mode is set, the procedure directly proceeds to step r6, that is, the procedure of step r5 is omitted.

Upon examination of the completion of the focus adjustment by the signal inputted into the port I6 of the CPU, when the shifting of the lens is interrupted after the completion of the focus adjustment at step r6, the magnet control portion MD is operated so as to commence the opening operation of the shutter by energizing the shutter magnet SMG at step r7. If the trigger switch S3 is in the off-state at step r8, the system is kept waiting until the trigger switch S3 is turned on. When the trigger switch S3 is turned on at step r8 simultaneously at the time when the shutter starts to open and the film is about to be exposed to the light, the exposure time period is counted at step r9 until it coincides with the exposure time calculated in advance.

In case of a flash photography, although a flag for the flash photography is set to "1" when it has been judged that the flash light is required at the previous exposure calculation, the flag is examined at step r10 and if this flag is set to "1", that is, if the system is in the flash photographing mode, it is commenced to count the flash timing at step r11. Thereafter, the flash timing is examined a step r12 whether or no the shutter is opened to the extent of a predetermined aperture and when the flash timing has been judged to be proper, the flash light is emitted at step r13 by giving a signal ordered for flashing from the output port 06 of the CPU to the flash portion FL.

In either of a natural light photography and the flash photography, upon elapse of the calculated exposure period, it is judged that the required exposure has been completed at step r14 and the shutter is caused to close by de-energizing the shutter magnet SMG at step r15.

On the other hand, when the counting of the exposure time period has been completed at step r16 before the proper flash timing, the shutter magnet SMG is deenergized at step r17 so as to emit the flash light at step r18. When the exposure has been completed, the power transistor TR is turned off at step r19 to bring the operation for measuring the light and the distance to a halt. Then, it is commenced to charge the main capacitor at step r20 and the flag for the flash photography is reset at step r21 and the system is brought into the stand-by state at step r22.

Figure 6:
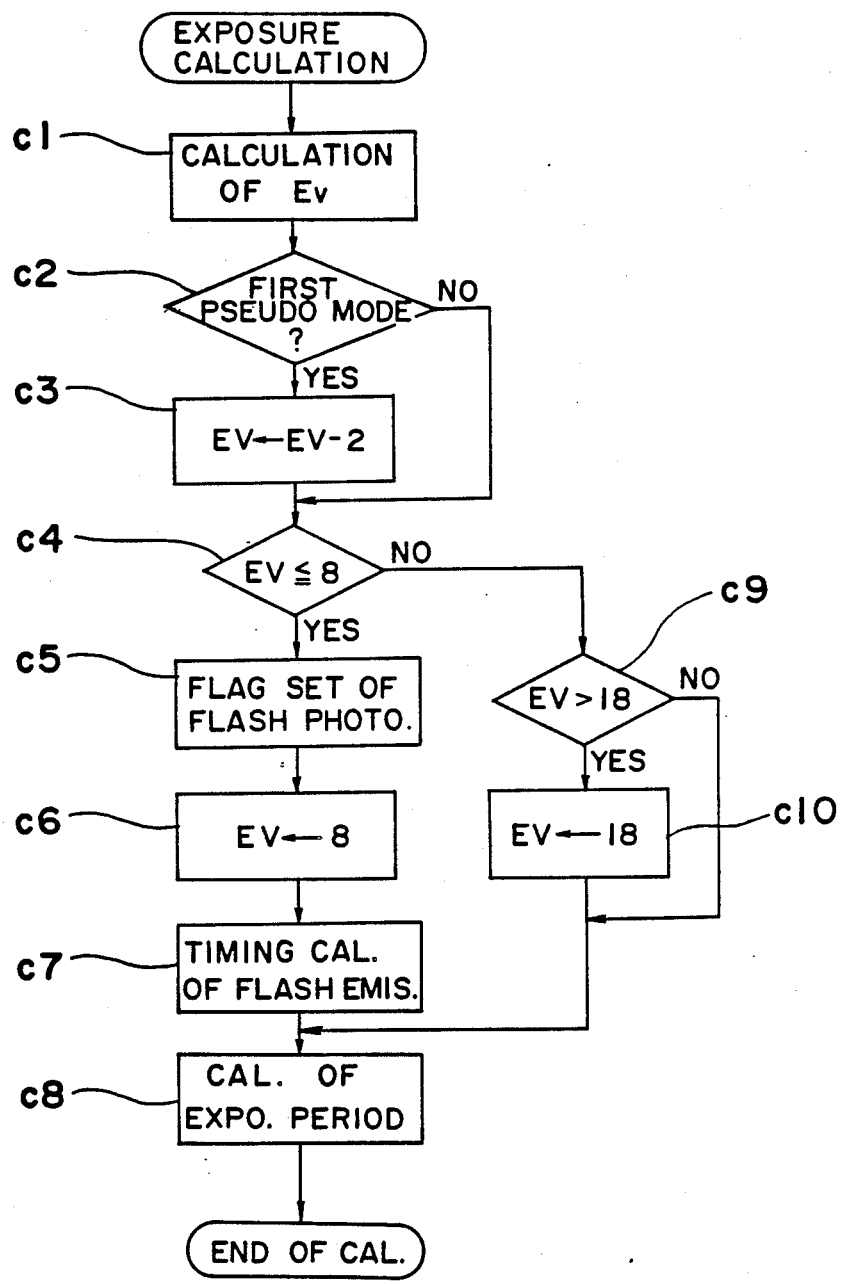
FIG. 6 is a flow-chart of signals management in the CPU, which particularly shows a routine for an exposure calculation.

Referring further to a flow-chart of FIG. 6, a routine for calculating the exposure will be explained hereinafter.

An optimum exposure value Ev is firstly calculated at step c1 from the brightness of the object which has been measured at the light measuring portion LM and the film sensitivity read by the film sensitivity reading portion DX. At step c2, it is judged whether or not the system is selectively set in the first mode of the pseudo focal length photographing mode having the shallow depth-of-field. If the system is set in the first mode at step c2, the Ev-value for controlling the exposure is newly calculated at step c3 by subtracting 2 from the exposure value Ev calculated previously. It is examined at step c4 whether or not the Ev-value is equal to or smaller than 8 and if it is equal to or smaller than 8, the flag for the flash photography is set to "1" at step c5 so as to carry out the flash photography. At step c6, 8 is substituted for the Ev-value as a restricted value for low brightness and a count value for the timing of the flash emission is calculated from the measured distance and the film sensitivity at step c7. Furthermore, after a count value of the exposure period has been calculated from the Ev-value at step c8, the calculation for the exposure is completed.

When the Ev-value is greater than 8 at step c4, it is judged at step c9 whether or not it is greater than 18. If the Ev-value is greater than 18, 18 is substituted for the Ev-value as another restricted value for high brightness at step c10 and upon calculation of the count value of the exposure period according to this result, the calculation for the exposure is completed. When the Ev-value is greater than 8 and is equal to or smaller than 18, the count value of the exposure time period is calculated from the present Ev-value and thereafter, the calculation for the exposure is completed.

Figure 7:
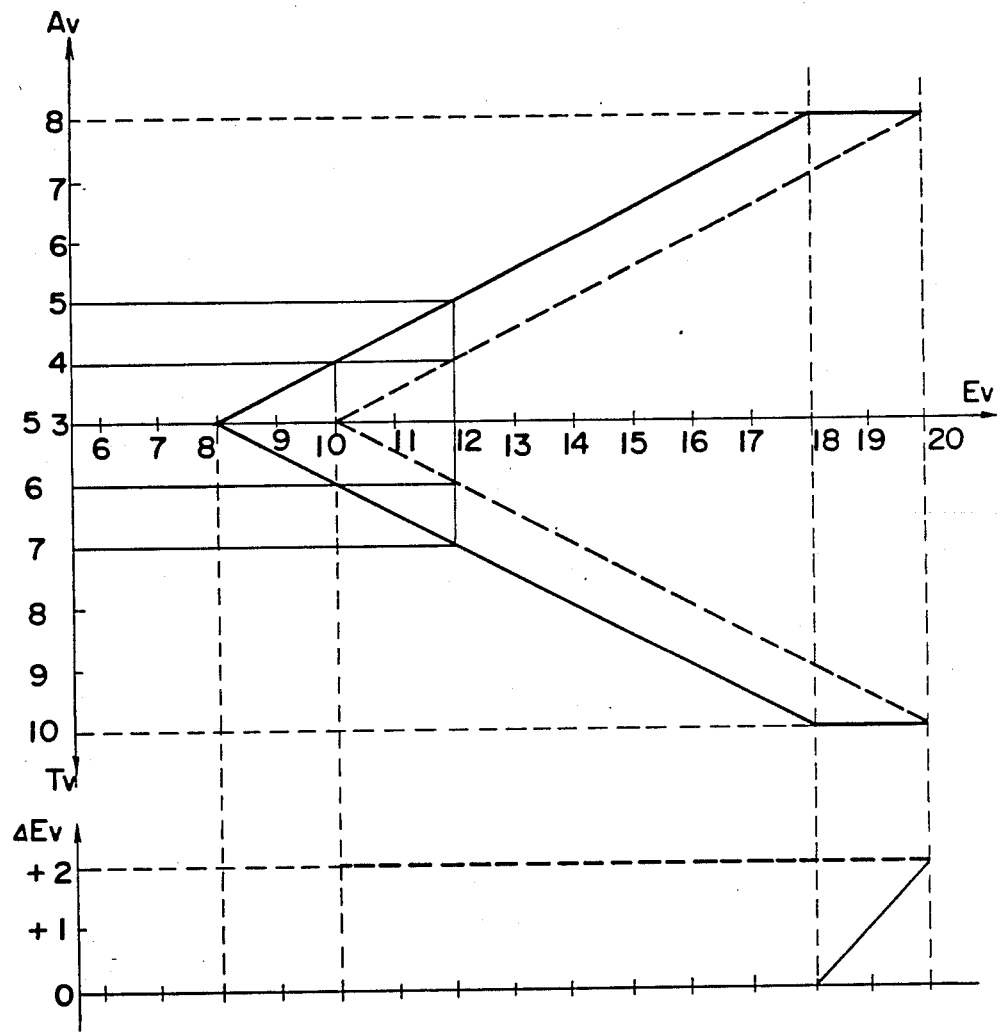
FIG. 7 is a graph showing a relationship between an exposure value and an aperture, and a relationship between the exposure value and a shutter speed.

FIG. 7 graphically illustrates a relationship between the exposure value Ev and the aperture value Av, a relationship between the former and the shutter speed value Tv, and a relationship between the former and the exposure error AEv. In the embodiment, the exposure time period and the aperture are controlled in a programmed manner. In the graph of FIG. 7, Ev-values are plotted on the horizontal scale, and Av-values and Tv-values are plotted on the longitudinal scale. Solid lines show a case where either of the real focal length photographing mode and the second pseudo focal length photographing mode is selected as the photographing mode, and dotted lines show another case where the first pseudo focal length photographing mode is selected as the photographing mode.

Hereupon, provided that Ev=12, Av=5 and Tv=7 in either case of the real focal length photographing mode and the second pseudo focal length photographing mode, and Av=4 and Tv=6 in case of the first pseudo focal length photographing mode. This means that the values of the latter are equivalent to those of the former in the case where the exposure value is set smaller by 2Ev than the aforementioned value.

Furthermore, when Ev-value is equal to or smaller than 8 in either case of the real focal length photographing mode and the second pseudo focal length photographing mode, or when Ev-value is equal to or smaller than 10 in case of the first pseudo focal length photographing mode, the system is set in the flash photographing mode. On the other hand, when Ev-value is greater than 18 in either case of the real focal length photographing mode and the second pseudo focal length photographing mode, the system is held under the restriction for high brightness and both of Av and Tv are fixed to be the constant values respectively corresponding to the values in the case where Ev=18.

According to the above described embodiment of the present invention, since the aperture is further opened by 1Ev in case of the first pseudo focal length photographing mode, when a lens having a focal length ratio of $f2/f1=\sqrt{2}$ is used, it is capable of obtaining the photograph having the same depth-of-field as that of the photograph taken through a lens having the focal length of f2. More specifically, on the assumption that a lens having the focal length of 35 mm is mounted on the photographic camera of the present invention, when a comparison is made between the photograph obtained through the trimming process by using this lens so as to correspond to the photograph taken through a lens having the focal length of 50 mm and another photograph actually taken by using the lens having the focal length of 50 mm, the former in the first mode has the same depth-of-field as the latter has and the former in the second mode has the deeper depth-of-field than the latter has.

As described so far, according to the embodiment the photograph taken in the pseudo focal length photographing mode has the depth-of-field deeper than that of the photograph taken through a lens having the long focal length, with the former and the latter being equivalent to each other in an angle of view. In the case where the photograph of the latter is caused to have the same depth-of-field as that of the former, since the aperture is set to the open side in the former e.g. in the pseudo focal length photographing mode rather than in the latter, the shutter speed can be shortened.

Furthermore, when it is requested to obtain the photograph having the shallow depth-of-field as taken through a telephoto lens, it can be readily realized by setting the aperture to the open side and as a result, the shutter speed can be also shortened.

That is, according to the embodiment not only both of a photographic effect in the pseudo focal length photographing mode and another photographic effect by the telephoto lens can be obtained by using a single photographic camera, but also the aperture can be set to the open side as compared with that in the conventional camera and accordingly, the field for the photography can be widened.

Moreover, although a plurality of the photographing modes are provided in the photographic camera of the embodiment, it is extremely easy for a user to selectively correctly set each of the photographing modes, while all of the photographic modes capable of being selected are displayed on the camera for easy comprehension to the user through a sight thereto. Since selected one of the modes is caused to be distinguished from others, it can be advantageously reduced to erroneously select one of the modes.

In addition, by the construction of the photographic camera according to the embodiment, since the film is over-exposed in the first pseudo focal length photographing mode rather than the proper exposure value in the real focal length photographing mode, chaps of the particles on the film plane are caused not to become conspicuous in the pseudo focal length photographing mode in which a relatively large enlargement magnification is required.

It is to be noted that in the aforementioned embodiment, although the over-exposure results from the fact that the exposure time period and the aperture size are controlled by the programmed manner, the exposure and the Ev-value is rectified to be smaller so as to control the aperture to the open side, the proper exposure can be obtained in a manner that the shutter speed is so controlled as to be rectified to the high speed side by further opening the aperture.

It is also to be noted that the film may be over-exposed at all times in the first pseudo focal length photographing mode and in addition, the present invention is applicable to the camera which is capable of independently controlling the aperture and the shutter as well as a single lens reflex type camera.

It is further to be noted that in this embodiment, although the film used becomes to be over-exposed in the first pseudo focal length photographing mode on the occasion of the natural light photography, the phenomenon like this can be realized in the flash photography. More specifically, the electronic flash is caused to emit the flash light at the time when the aperture is further opened as compared with the exposure value calculated from the distance information in the case where the electronic flash is controlled by an automatically controlled flash timer. On the other hand, in the case where an automatically light-regulatable flash system is employed in the photographic camera, the above described phenomenon can be realized in a manner that the light emission is suspended at the time later to some extent than in the ordinary flash photography.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A photographic camera comprising:
   means for selecting between a real focal length photographing mode and a pseudo focal length photographing mode, a field to be printed in the pseudo focal length photographing mode being narrower than that in the real focal length photographing mode;
   means for measuring a brightness of an object to produce a first signal in accordance with the measured brightness;
   means for outputting a second signal in accordance with a film speed; and
   means for controlling an exposure in accordance with the first and second signals, said controlling means including means, responsive to said selecting means, for shifting the exposure to an overexposure side in the pseudo focal length photographing mode relative to the case in the real focal length photographing mode.

2. A photographic camera is claimed in claim 1, wherein said shifting means comprises means for shifting an aperture of said camera to an open side in the pseudo focal length photographing mode relative to the case in the real focal length photographing mode.

3. A photographic camera comprising:
- means for selecting between a real focal length photographing mode and a pseudo focal length photographing mode, a field to be printed in the pseudo focal length photographing mode being narrower than that in the real focal length photographing mode;
- means for measuring a brightness of an object to produce a first signal in accordance with the measured brightness;
- means for outputting a second signal in accordance with a film speed; and
- means for controlling an aperture in accordance with the first and second signals, said controlling means including means, responsive to said selecting means, for shifting the aperture to an open side in the pseudo focal length photographing mode relative to the case in the real focal length photographing mode.

4. A photographic camera comprising:
- first selecting means for selecting between a real focal length photographing mode and a pseudo focal length photographing mode, a field to be printed in the pseudo focal length photographing mode being narrower than that in the real focal length photographing mode;
- second selecting means for selecting between a first and second sub-modes in the pseudo focal length photographing mode;
- means for measuring a brightness of an object to produce a first signal in accordance with the measured brightness;
- means for outputting a second signal in accordance with a film speed; and
- means for controlling an aperture in accordance with the first and second signals, said controlling means including means, responsive to said first and second selecting means, for causing the aperture to open more in the first sub-mode in the pseudo focal length photographing mode relative to the case in the real focal length photographing mode or the second sub-mode in the pseudo focal length photographing mode.

* * * * *